J. V. LAFOND.
HANDLE AND SHIELD FOR COOKING VESSELS.
APPLICATION FILED NOV. 30, 1920.
1,391,125. Patented Sept. 20, 1921.
2 SHEETS—SHEET 1.
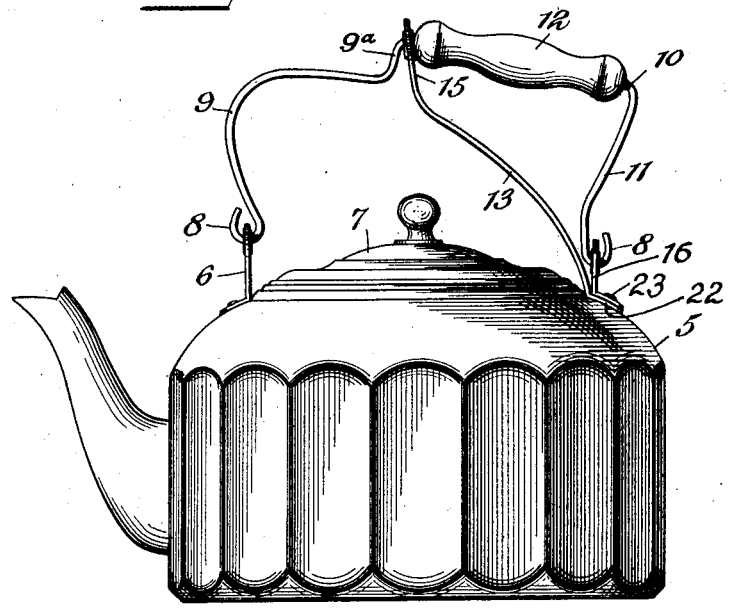
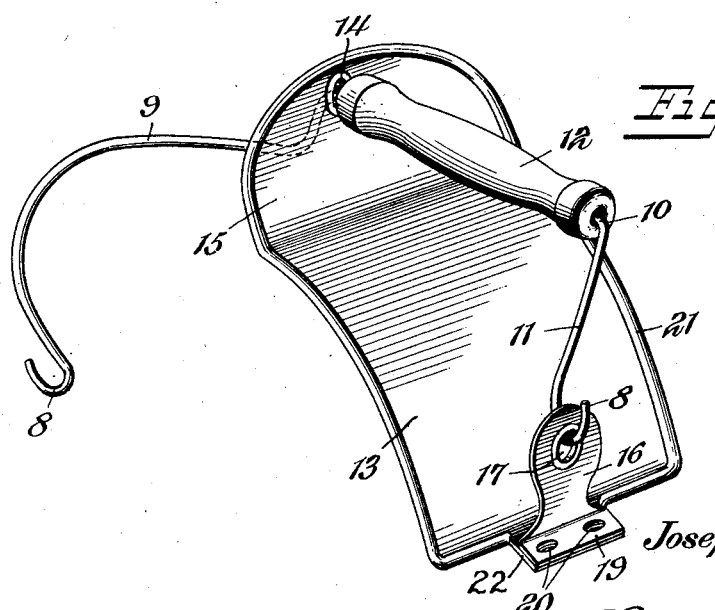
Joseph V. Lafond
INVENTOR
WITNESSES
Charles H. Ourand
Philip E. Siggers
BY
E. G. Siggers
ATTORNEY

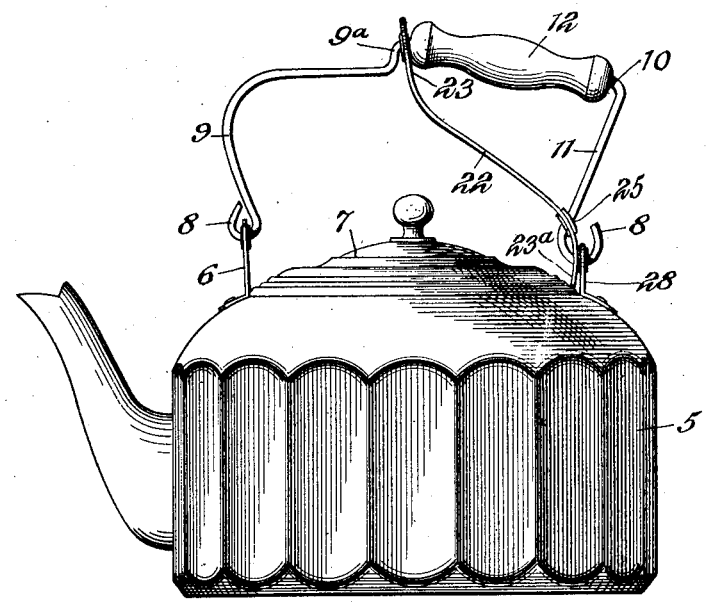
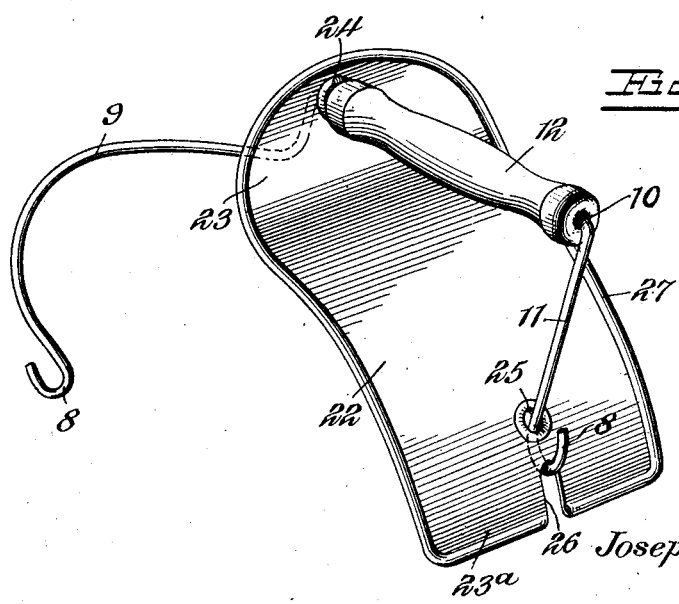

UNITED STATES PATENT OFFICE.

JOSEPH V. LAFOND, OF CHICAGO, ILLINOIS.

HANDLE AND SHIELD FOR COOKING VESSELS.

1,391,125.　　　　　Specification of Letters Patent.　　Patented Sept. 20, 1921.

Application filed November 30, 1920.　Serial No. 427,329.

*To all whom it may concern:*

Be it known that I, JOSEPH V. LAFOND, a citizen of the United States, residing at Chicago, in the county of Cook and State of Illinois, have invented a new and useful Handle and Shield for Cooking Vessels, of which the following is a specification.

This invention relates to bails and shields or protectors for domestic cooking vessels. Objects of the invention are to provide a handle and shield for such vessels whereby the shield will protect the hand from steam arising from the vessel; and to support such shield so that the vessel may be filled or emptied and covered without interference on the part of the shield.

Another object is to provide an attachment for tea kettles and like cooking vessels which will not add materially to the cost of their manufacture.

Another object is to so construct the handle and shield that it may be readily applied to ordinary cooking vessels without any substantial change in the construction of the latter.

A further object is to provide an improved shield which will maintain the bail or handle in an upright position, whereby the handle will not be heated when the vessel is upon a stove above a temperature readily borne by the hand.

It is a further object of the invention to provide an attachment for vessels which will provide an ear for the securing of one end of the improved handle, and which will also maintain one end of the shield in fixed position upon the vessel whereby both the handle and shield form a permanent attachment for the vessel when once installed.

The invention will be best understood from a consideration of the following detailed description taken in connection with the accompaniyng drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1 is an elevation of the preferred form of the invention shown applied to a tea kettle.

Fig. 2 is a perspective view of the attachment.

Fig. 3 is an elevation of a modified form of the attachment shown applied to a tea kettle.

Fig. 4 is a perspective view of the attachment of Fig. 3.

It is often desirable to fill a tea kettle or other vessel before it is entirely empty while it contains a quantity of steaming water. Where a faucet is available, it is a common practice to carry the vessel to the faucet, remove the lid and let fresh water run therein. Pouring in of fresh water always sends up a cloud of steam and often results in the scalding of the hands, since in the ordinary cooking vessel the handle or bail is located directly over the opening of the vessel so that the hand in supporting the vessel is in the direct path of the rising steam. Even if a dipper is used to fill the kettle with fresh water, the hand is frequently scalded by the steam, since it often is necessary to employ the hand to properly support the kettle. Furthermore, ordinary kettles have spouts and when they are tilted in the act of pouring, the steam arising from the hot water flowing out of the spout is brought into contact with the hand which is supporting the kettle. This too results frequently in burning.

The improved bail or handle with its attached shield is designed to overcome these objections to tea kettles and other cooking vessels as usually constructed.

The tea kettle 5 is to be considered as illustrative of any type of cooking vessel employing a lid or cover. An ear 6 is shown adjacent to the filling opening of the vessel. A lid 7 ordinarily covers the opening. At a point diametrically opposite from the ear 6 a second ear is secured to the vessel in a manner to be presently described.

The bail is preferably made of steel wire of the proper gage to insure the desired strength and resiliency. This wire bail has its ends bent to form eyes 8, these eyes being engageable with the ears of the cooking vessel. Intermediate its ends, the bail is bent in a peculiar manner so that the ends of the bail tend to spring apart and thus hold the bail in upright position above the vessel when installed. An outwardly curved or bowed portion 9, hereafter called the long arm of the bail, a relatively short and straight portion 11, and a handle portion 10 together comprise the bail intermediate the eyes 8. The portions 11 and 10 form an acute angle with each other. The handling portion 10, when the bail is upright or in its installed position, extends above the long curved arm 9 and the short straight arm 11 and is disposed at an angle to the horizontal. Upon the handling portion a wooden or similar handle or grip 12 is mounted. This handle is approximately the length of the straight handling portion 10 and is locked in place after the bail has been bent to its final shape. When the device is installed upon a tea kettle, the grip 12 will have its forward end or that end nearer the spout directly above the center of the kettle, while its rear end will extend beyond the kettle opening.

Interposed between the grip and the cover of the kettle or other vessel is a shield or protecting plate 13. This shield, which is formed from an initially flat metallic plate, preferably has beaded edges 21, to protect the hands, to add to the appearance of the shield, and to give it the desired rigidity. The intermediate portion of the shield is nearly flat and its upper end is bent upwardly so as to assume almost a vertical position as indicated at 15. This upwardly-bent end of the shield has a perforation 14 through which the bail passes. The shield at this end is locked between the grip 12 and that portion of the bail where the bent arm 9 joins the handling portion 10. This section of the bail is designated by the numeral 9$^a$ and extends approximately at right angles to the handling portion 10.

The lower end of the shield, in the construction of Figs. 1 and 2, has an extension or flange 22 integral therewith. An ear 16 having a flange 19 of the same size as flange 22 is united to the vessel by rivets 23 passing through holes 20 in the flanges 19 and 22. Thus the shield and ear are united by the same elements permanently to the cooking vessel. The ear 16 has a perforation 17 adapted to receive the eye 8 adjacent the short arm 11 of the bail. By this construction, it is clear that the shield will sustain the bail in a vertical position at all times, so that the handle never becomes hot even if the vessel stands upon a stove for a considerable period of time. When boiling water is poured from the vessel, the steam arising therefrom cannot strike the hand which supports the vessel. If the attachment is used with a tea kettle, the steam arising from the spout, even if the kettle is almost empty, is deflected so that scalding of the hand is prevented.

The construction illustrated in Figs. 3 and 4 employs exactly the same bail previously described but a somewhat different form of shield is used. Here the shield is not a permanent attachment of the vessel, but instead is united semi-permanently at each end with the bail and is removed therewith. The shield 22 has an upturned upper end 23 provided with a perforation 24 through which the handle portion 10 passes and a beaded edge 27 similar to the edge 21 of shield 13. The lower end of the shield is bent downward as at 23$^a$ and has a slot 26 extending from the lower edge in a medial line. A perforation 25 is provided near the inner end of the slot 26 but spaced therefrom. The short arm 11 of the bail is adapted to pass through the perforation 25, while the adjacent eye 8 passes through the slot 26 so that that portion of the shield between the perforation 25 and the inner end of the slot is comprehended within said eye 8. This same eye is engaged in the usual way with an ear 28 diametrically opposite from the ear 6.

In this second construction, the bail, as before, has a sufficient spring so that its ends tend to separate, whereby it will maintain itself in upright position. At the same time, the lower edge of the shield 22 will engage with the top of the vessel and the bent end 23$^a$ will press against the inner face of ear 28 to prevent the handle from falling down alongside the vessel.

Both forms of the attachment maintain the bail in upright position so that the handle can never become overheated. Both forms prevent all possibility of the hand being scalded by steam. Both forms are readily installed, are economical to manufacture, give the hand which engages the grip plenty of room, and if anything add to rather than detract from the appearance of the cooking vessel.

What is claimed is:—

1. The combination with a vessel having a bail, of a shield connected at both ends to the bail and spaced intermediate its ends from both the vessel and bail, said shield being of sufficient width to protect the hand from steam arising from the vessel, and said shield holding the bail in upright position above the vessel.

2. The combination with a vessel having a filling opening and a pair of ears bordering the filling opening, of a bail having its ends formed with eyes connected to said ears, said bail having an intermediate straight handling portion, a grip on said handling portion, a long curved arm between the handling portion and one ear, and a short straight arm between the handling portion and the other ear, whereby the handling portion lies above the rest of the bail when the latter is installed upon the vessel, and a shield connected at one end to the bail between the long curved arm and the grip and connected at the opposite end to an ear of the vessel.

3. The combination with a vessel having a hinged bail, of a shield connected to the bail at its upper end and permanently united to the vessel at its lower end, whereby said shield maintains the bail at all times in an upright position.

4. The combination with a vessel having a bail, an intermediate handling portion on said bail, a grip mounted upon said handling portion, long and short arms integral with the handling portion and holding the grip in position thereon, of a shield having a perforation at its upper end and bent upwardly at that end, the bail passing through the said perforation so that the shield is locked to the bail between the grip and that portion of the bail where the long arm joins the handling portion, and means for connecting the lower end of the shield to the vessel.

5. The combination with a vessel having a bail, of a shield mounted at one end upon said bail at an intermediate point thereof, said shield having a flange at its other end, an ear permanently connected to the vessel and holding the shield in place upon the vessel, a fastening means for the ear also holding the shield to the vessel, one end of the bail being connected with said ear above the vessel outside of the shield.

6. The combination with a vessel having a bail, an intermediate handling portion on said bail, a grip mounted upon said handling portion, long and short arms integral with the handling portion and holding the grip in position thereon, of a shield having a perforation at its upper end and bent upwardly at that end, the bail passing through the said perforation so that the shield is locked to the bail between the grip and that portion of the bail where the long arm joins the handling portion, and means for connecting the lower end of the shield to the short arm of the bail.

7. The combination with a vessel having a bail, of a shield provided thereon, said shield being connected at one end with an intermediate portion of said bail and having connection at its other end with one end of said bail, and said shield engaging the vessel to hold the bail in an upright position.

In testimony, that I claim the foregoing as my own, I have hereto affixed my signature.

JOSEPH V. LAFOND.